(12) United States Patent
Miyazaki

(10) Patent No.: US 6,394,929 B1
(45) Date of Patent: May 28, 2002

(54) SHIFT CONTROL APPARATUS AND SHIFT CONTROL METHOD OF AUTOMATIC TRANSMISSION

(75) Inventor: Takeshige Miyazaki, Anjyo (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 09/562,804

(22) Filed: May 2, 2000

(30) Foreign Application Priority Data

May 24, 1999  (JP) ............................................. 11-143166

(51) Int. Cl.$^7$ ............................................... B60K 41/02
(52) U.S. Cl. ............................. 477/77; 477/80; 477/84
(58) Field of Search ............................. 477/77, 79, 80, 477/83, 84, 85, 90

(56) References Cited

U.S. PATENT DOCUMENTS 4,683,996 A * 8/1987 Hattori et al. .................. 477/80
5,427,215 A * 6/1995 Jarvis ........................ 477/84 X

FOREIGN PATENT DOCUMENTS

| GB | 2231116 | * 11/1990 | ................. 477/86 |
| JP | 60-215435 | 10/1985 | |
| JP | 62113952 | * 5/1987 | ................. 477/80 |
| JP | 2150513 | * 6/1990 | ................. 477/86 |
| WO | 97/05410 | 2/1997 | |
| WO | 97/29307 | 8/1997 | |

* cited by examiner

Primary Examiner—Charles A Marmor
Assistant Examiner—Ha Ho
(74) Attorney, Agent, or Firm—Burns, Doane, Swecker & Mathis, LLP (57) ABSTRACT

A shift control apparatus and a shift control method for the automatic transmission, which can reduce the required value of the drive force for the shift actuator, to make the automatic transmission cheaper and to improve install character thereof. The shift control apparatus includes a transmission 2, a clutch 3, a first drive means 4, 6 for operating the clutch, a second drive means 5 and 6 for operating a synchro mechanism, a third drive means 6 and 31 for varying the number of rotation of an engine, and a control unit 30 for controlling the first, second and third drive means. The control unit 30 has a clutch control portion 18 to control the first drive means, a synchro control portion 19 to drive the second drive means the engine, and an engine control portion 20 to control the third drive means.

8 Claims, 7 Drawing Sheets

SHIFT CONTROL APPARATUS AND SHIFT CONTROL METHOD OF AUTOMATIC TRANSMISSION

BACKGROUND OF THE INVENTION

1. Field of the Invention

This invention relates to a shift control apparatus and a shift control method of an automatic speed-change apparatus (transmission) of an automobile for automatically speed-changing a clutch disposed between an engine and the transmission, and for speed-changing a synchromesh mechanism of the transmission which changes a gear mesh mode thereof by an actuator, respectively.

2. Related Art

Figure 8:
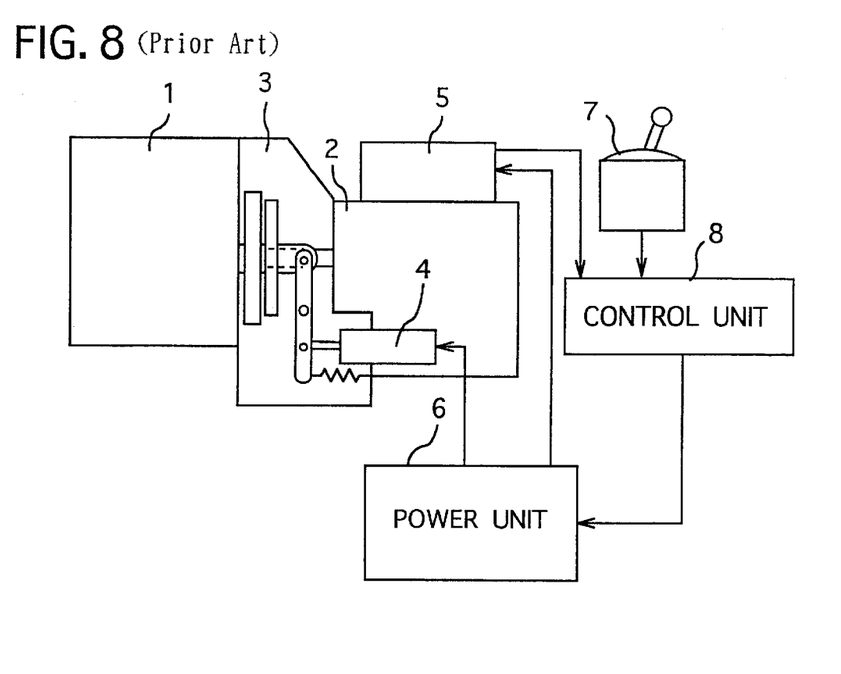
FIG. 8 is a constructive view showing a shift control apparatus of a conventional automatic transmission.

The above mentioned type automatic transmission is for example disclosed in WO97/05410, and a shift control apparatus thereof is shown in FIG. 8. As apparent from FIG. 8, the shift control apparatus is comprised of a first (select) actuator for operating a clutch 3 disposed between an engine 1 and a speed change apparatus (transmission) 2, a second (shift) actuator 5 for operating each of synchromesh mechanisms in the transmission 2, a power unit 6, a speed-change switch 7 and an electronic control unit (ECU) 8.

The power unit 6 of hydraulic type or electrical type operates the first and second actuators 4 and 5. The speed-change switch 7 is operated by a driver and outputs a speed-change signal corresponding to a target speed-change shift to the ECU 8. The ECU 8, based on the shift-change signal from the speed-change switch 7 and signals from various sensors, commands the power unit 6 to control operation of the first and second actuators 4 and 5 electronically.

Thus, the speed-change signal from the speed-change switch 7 operated (switched) by the driver is processed in the ECU 8, based on which the power unit 6 supplies predetermined operating outputs are supplied from the power unit 6 to the first and second actuators 4 and 5, thereby performing a gear shift so-called "finger touch control".

Figure 9:
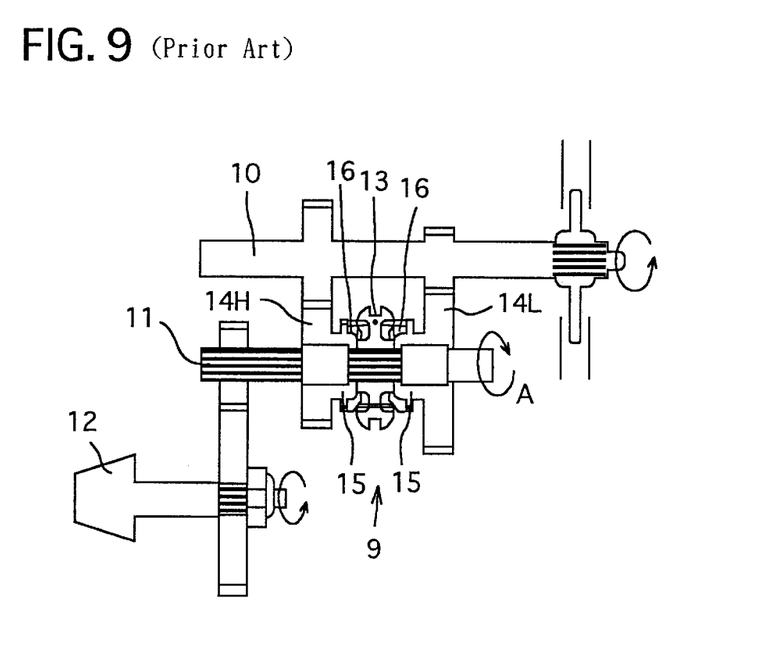
FIG. 9 is an explanatory view showing a conventional speed-change mechanism.

A synchromesh mechanism 9 of the above transmission shown in FIG. 9 is provided with a sleeve 13 and a pair of synchronize rings 16 (briefly called "ring" hereinafter). The sleeve 13 is mounted, in a gear train including plural gears mounted on an input shaft (speed shaft) 10, a counter shaft 11 and an output shaft 12 disposed parallel to each other, on the counter shaft 11 to be slidable axially and not rotatable relative to the counter shaft 11. Each of the rings 16 frictionally contacts with a cone surface of a gear piece 15 (a clutch gear associated with free-rotate gears 14L and 14H to be rotated integral therewith) so that the sleeve 13 meshes with the gear piece 15 after eliminating a relative rotation difference therebetween.

Figure 10:
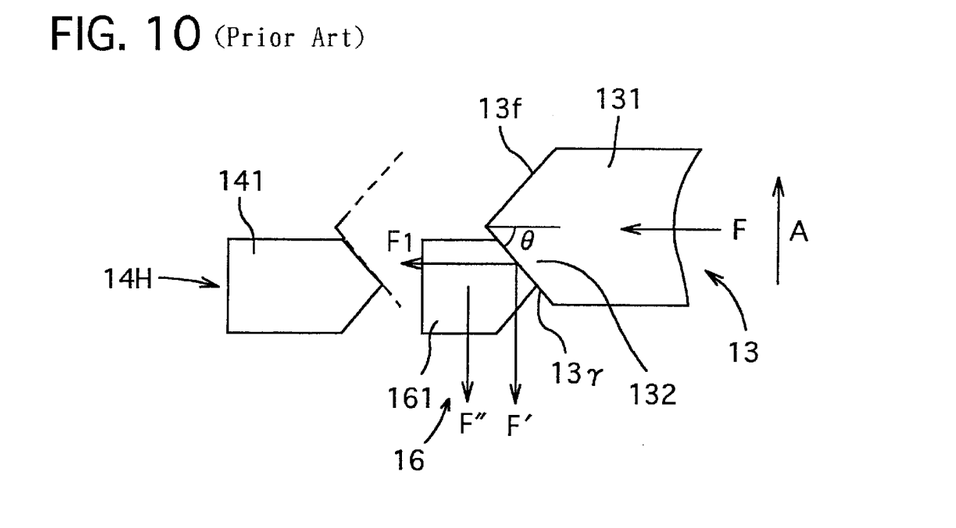
FIG. 10 is an explanatory view showing a meshed condition in up-shift operation in the conventional art.

When a shift of the transmission 2 having the synchromesh mechanism 9 is changed (up-shifted), the ring 16 pushed by the sleeve 13 driven by the second actuator 5, is accelerated by the gear piece 15 of the free-rotate gear 14H which rotates in higher speed than that of the sleeve 13. Accordingly, as shown in FIG. 10, outer tooth 161 of the ring 16 abuts onto a rear surface (lower surface in FIG. 10) 13r of the sleeve 13 facing rearwardly, relative to a rotate direction A (upward in FIG. 10) of the counter shaft 11 (this is called "balk point"). In a push-apart process after the balk point, the sleeve 13 is as shown by a two-dotted line pushed by an operate force F of the second actuator 5, to push the ring 16 by a drive force F1 leftwardly (in FIG. 10), and to push apart the ring 16 by a push-apart force F' downwardly (in FIG. 10). Thus, outer tooth 141 of the gear piece 15 of free-rotate gear 14H rotating in higher rotation speed is pushed apart, so that the sleeve 13 engaged with the gear piece 15 of the free-rotate gear 14H.

Figure 11:
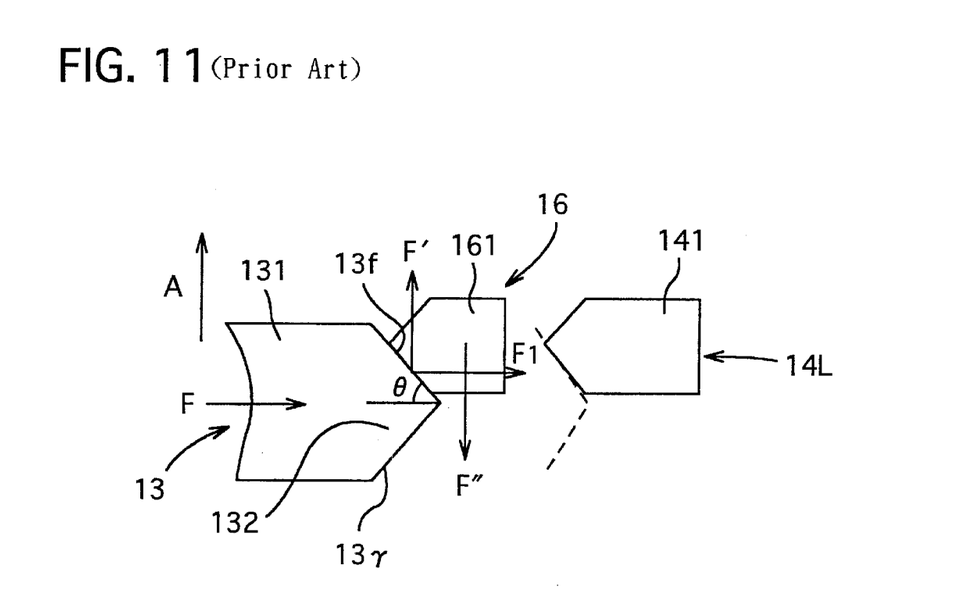
FIG. 11 is an explanatory view showing a meshed condition in down-shift operation in the conventional art.

On the other hand, when a shift of the transmission 2 having the synchromesh mechanism 9 is down-shifted, the ring 16 pushed by the sleeve 13 driven by the second actuator 5, is decelerated by the gear piece 15 of the free-rotate gear 14L which rotates in lower speed than that of the sleeve 13. Accordingly, as shown in FIG. 11, outer tooth 161 of the ring 16 abuts onto a front surface (upper surface in FIG. 11) 13r of the sleeve 13 facing frontwardly, relative to a rotate direction A (upward in FIG. 10) of the counter shaft 11 (this is called balk point). In a push-apart process after the balk point, the sleeve 13 is as shown by a two-dotted line pushed by an operate force F of the second actuator 5, to push the ring 16 by a drive force F1 rightwardly (in FIG. 11), and to push apart the ring 16 by a push-apart force F' upwardly (in FIG. 11). Thus, outer tooth 141 of the gear piece 15 of free-rotate gear 14L rotating in lower rotation speed is pushed apart, so that the sleeve 13 engaged with the gear piece 15 of the free-rotate gear 14L.

The push-apart force F' of the ring 16 by the sleeve 13 in shifting-up and shifting-down operations is generally determined by value of a tip angle θ of the chamfer 132 of the sleeve 13 and a value of drive force F of the sleeve 13. Provided that the value of drive force F of the sleeve 13 by the second actuator 5 is constant, the push-apart force F' becomes larger as the value of the tip angle θ of the chamfer 132 becomes smaller. However, since the push-apart force F' needs to be smaller than the cone torque to perform the synchronize operation, the tip angle θ can not be selected to be smaller over a predetermined value. For this reason, in designing each components, the tip angle θ of the sleeve 13 is determined in advance, then the second actuator 5 which can generate the drive force F sufficient to obtain the force F' necessary for push-aparting the ring 16 is selected.

However, in the conventional automatic transmission, there is actually a case where the second actuator 5 which has ability or power twice compared with that required from design aspect is needed. This results from the fact that, when the automatic transmission is installed on the vehicle, the push-apart force F' based on the drive force F applied from the second actuator 5 and necessary for the sleeve 13 varies, depending on a resistance of a lubricant oil (briefly called "oil" hereinafter) contained in a transmission case based on a dynamic viscosity thereof. In detail, in the synchromesh mechanism 9 of the transmission 2 shown in FIG. 9, the dynamic viscosity of oil a surface level of which normally corresponds to position of the counter shaft 11 increases in a low-temperature condition, so that an agitate or stir resistance of the oil also increases. The gear pieces 15 associated with the free-rotate gears 14H and 14L and the rings 16, in rotating in the oil receive the stir resistances F" in a direction reverse to the rotate direction A of the counter shaft 11, as shown in FIGS. 10 and 11.

This stir resistance F" acts onto the ring 16, especially in the down-shift as shown in FIG. 11, in the direction reverse to the push-apart force F' applied to the ring 16 and the gear piece 15 by the sleeve 13. In order to make the push-apart force F' larger than the stir resistance F" (F'>F"), the larger drive force F should be applied to the sleeve 13 from the second actuator 5, which needs to make the power of the second actuator 5 larger. The stir resistance F" of the oil increases like an index function as the atmospheric temperature i.e. the oil temperature decreases, and the stir resistance F" in the normal temperature may become twice or more when the oil is used in the cold area.

Accordingly, in the conventional automatic transmission, the second actuator 5 shifting the sleeve 13 needs to have the drive force F which can overcome the stir resistance F" of the oil due to the dynamic viscosity thereof in the low temperature. As the result, when the second actuator 5 is of hydraulic type operated by an oil pressure or air pressure, diameter of a piston or capacity of an accumulator of pump will becomes larger; when it is of electrical type, necessary current and voltage become larger. Thus, in both cases, the whole shift control system becomes larger, which is inconvenient for the manufacturing cost and the installation. In addition, such drive force F of the second actuator 5 is required only when the vehicle runs in the very cold area where atmospheric temperature is below –(minus) 20° C. Making the piston diameter of the actuator and the accumulator of the pump larger for such rare case has little merit and is not practical.

SUMMARY OF THE INVENTION

The present invention is made, in view of the above mentioned circumstances of the conventional automatic transmission, and intends to provide a shift control apparatus and a shift control method in the automatic transmission, which can reduce the required value of the drive force for the shift actuator, to make the automatic transmission cheaper and to improve install character thereof.

An inventor of this application has studied hard to overcome the above disadvantage of the conventional automatic transmission, and paid attention the forces applied to the ring 16 and the gear piece 15 from the sleeve 13 and the oil in the push-apart process of the up-shift. In shifting-up operation, as shown in FIG. 10, the free-rotate gear 14H rotates in higher speed than the sleeve 13, the outer tooth 161 of the ring 16 abuts onto the rear surface 13r of the two surfaces of chamfer of the sleeve 13 facing rearwardly relative to the rotate direction A of the counter shaft 11, so that the ring 16 is pushed apart by the push-apart force F' of the sleeve 13 directed in the same direction as the agitate resistance force F". Accordingly, in the up-shift operation, the push-apart force F' can be made smaller depending on value of the agitate force F". Thus, the second actuator 5 sufficiently has the smaller force F to push the sleeve 13.

In view of the above, the inventor has hit upon to generate the push-apart force F' in the reverse direction to the rotate direction A of the counter shaft 11 and in the same direction as the agitate direction in the down-shift operation as the occasion demands (for example, the vehicle running in the cold area), similar to the up-shift when the vehicle is running in the normal area.

That is, the shift control apparatus of the present invention for controlling an automatic transmission comprises a transmission including a synchro mechanism having at least one set of sleeve and a pair of free-rotate gears relatively rotatable on a rotate shaft; a clutch disposed between said transmission and an engine; a first drive means for operating said clutch; a second drive means for operating the synchro mechanism of said transmission; a third drive means for varying the number of rotation of the engine; and a control unit for controlling said first drive means, said second drive means and said third drive means based on a speed-change signal in a speed-change of said transmission. Said control unit includes a clutch control portion to control said first drive means so that said transmission is separated from the engine, then temporarily connected to the engine and then separated from the engine; a synchro control portion to drive said second drive means so that the synchro mechanism of said transmission is shifted-fall when said transmission is firstly separated from the engine, and is shifted push-in when said transmission is secondary separated from the engine; and an engine control portion to control said third drive means so that the numbers of rotation of the engine is increased when the synchro mechanism is shifted fall and said transmission is temporarily connected with the engine.

The shift control method of the present invention controls an automatic transmission including a transmission having a synchro mechanism having at least one set of sleeve and a pair of free-rotate gears relatively rotatable in a rotate shaft, a clutch disposed between said transmission and an engine, a first drive means for operating the clutch, a second drive means for operating the synchro mechanism of the transmission, and a third drive means for varying the numbers of rotation of the engine, by a control unit having a clutch control portion, a synchro control portion and a engine control portion respectively controlling the first drive means, the second drive means and the third drive means based on a speed-change signal in a speed-change of the transmission. The control method is comprised of steps of a shift-fall step for shifting fall the synchro mechanism by the synchro control portion via the second drive means, in condition where the transmission is separated from the engine by the clutch control portion via the first drive means; a clutch connect step for connecting the clutch temporally by the clutch control portion via the first drive means and for accelerating the engine by the engine control portion via the third drive means, in neutral condition of the clutch performed in said shift-fall step; and a shift push-in step for shifting push-in the synchro mechanism by the synchro control portion via the second drive means, in condition where the transmission is separated from the engine by the clutch control portion via the first drive means.

According to the shift control apparatus and the shift control method of the automatic transmission of the present invention, for example in shifting-down the transmission in which the sleeve is synchronized and meshed with the free-rotate gear rotating in the lower speed than the sleeve when the vehicle is running in the cold area, the rotate speed of the slower free-rotate gear is increased by operation of the clutch and control of opened degree of the accelerator. Thus, the numbers of rotation of the slower free-rotate gear is increased to a level higher than that of the sleeve. In this state, the gear piece of the slower free-rotate gear is synchronized and meshed with sleeve by the drive force of the second drive means. Therefore, in both of the synchronize area and the push-apart area, the ring is hardly reduced in the rotate speed thereof by the free rotate gear, and is brought into condition similar to the up-shift condition. As the result, the direction of force by the sleeve to push apart the ring in the rotate direction and the direction of the agitate resistance applied from the oil to the ring are coincided, so that the necessary drive force for the second actuator to drive the sleeve can be reduced.

The shift control apparatus and the shift control method of the automatic transmission of the present invention can have various embodying modes explained below.

The transmission can include a first type in which an input shaft, an output shaft and a counter shaft are disposed in parallel, or a second type in which the input shaft and the output shaft are disposed on a common axial and the counter shaft is disposed parallel thereto. In the first type, the synchro mechanism can be mounted on the input shaft or the counter shaft; in the second type, it can be mounted on the output shaft or the counter shaft.

The first, second and third drive means can be comprised of a power unit and a first, second and third actuators operated by the power unit. As the actuator, the hydraulic-type actuator using an oil pressure cylinder or an air pressure cylinder, and an electric-type actuator using an electric motor can be adopted. When the actuator is of hydraulic type, the power unit can be comprised of an oil pressure control circuit or an air pressure control circuit; when the actuator is of electric type, the power unit can be comprised of a power amplify circuit using a semi-conductor. The control unit can be comprised of an electronic control unit (ECU).

The synchro control portion can shift-fall the synchro mechanism, after the first interruption of the clutch is detected by sensors to detect decrease of the numbers of rotation of the engine or the input shaft, or decrease of a vehicle running speed. The synchro control portion, when temperature decrease of an oil in the transmission below a predetermined value is detected by sensors such as an oil temperature provided in the transmission a water temperature provided in the engine 1 or by an input rotation in the neutral condition, can cause a sleeve to separate from a faster free-rotate gear in a shift-fall of the synchro mechanism and the sleeve to engage with a slower free-rotate gear in shift push-in of the synchro mechanism.

The clutch control portion can temporarily connect the clutch, after the shift-fall of the synchro mechanism is detected by a stroke sensor disposed in the second drive means. The engine control portion, after the temporal connection of the clutch is detected, can accelerate the engine so that the numbers of rotation of the slower free-rotate gear exceeds the numbers of rotation of the sleeve of the synchro mechanism.

The temporally connected time period of the clutch by the clutch control portion and accelerated time period of the engine by the engine control portion, can be controlled by a timer operating in a predetermined time period after the shift-fall of the synchro mechanism by the synchro control portion. Also, the temporally connected time period of the clutch by the clutch control portion and accelerated time period of the engine by the engine control portion, can terminate when the numbers of rotation of the slower free-rotate gear exceeds the numbers of rotation of the sleeve of the synchro mechanism.

PREFERRED EMBODIMENT OF THE INVENTION

Hereinafter, the shift control apparatus and the shift control method of the automatic transmission according to the present invention will be explained with reference to attached drawings. Needless to say, the present invention is not limited to these embodiments but can include various deformations or modifications within a sprit of the present invention.

<First Embodiment>

Figure 1:
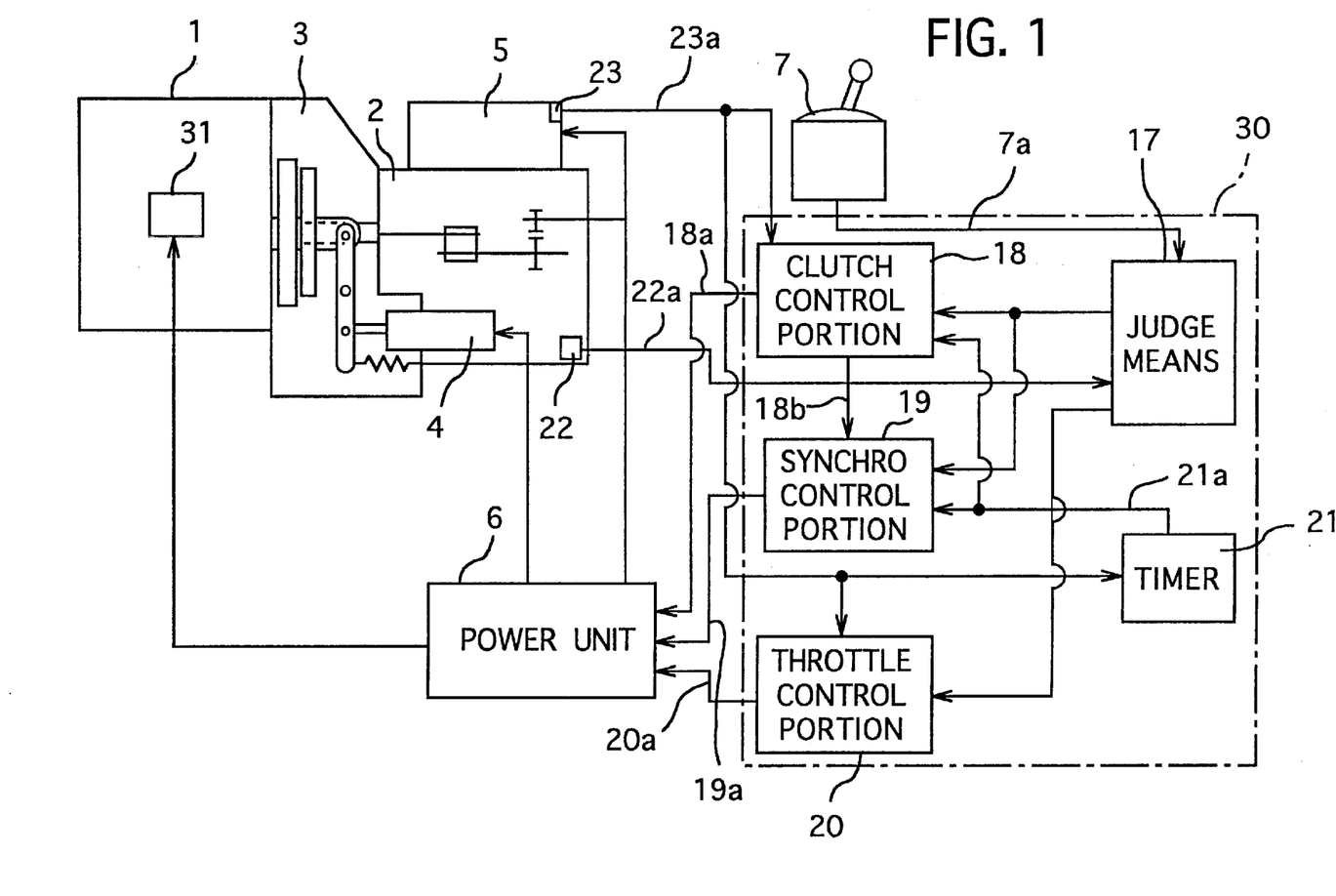
FIG. 1 is a constructive view showing a first embodiment of an automatic transmission according to the present invention.

FIG. 1 shows an automatic transmission of a first embodiment according to the present invention, in which reference numerals same as that in FIG. 8 are added to common components.

As shown in FIG. 1, this automatic transmission is comprised of, in a power transmit system including an engine 1, a clutch 3 and a speed-changer (transmission) 2, a first (select) actuator 4, a second (shift) actuator 5, a third actuator 31, a power unit 6, a speed-change lever 7 and an electronic control unit (ECU) 30. The first actuator 4 operates the clutch 3 disposed between the engine 1 and the transmission 2, the second actuator 5 operates a synchro-mesh mechanism 9 (refer to FIG. 9) mounted in the transmission 2, and the third actuator 31 operates a throttle of the engine 1 to control an opened degree thereof. The power unit 6 of hydraulic type or electric type drives the first to third actuators 4, 5 and 31. The speed-change lever 7 is handled by a driver and outputs a speed-change signal corresponding to a target shift to the ECU 30 explained next.

The ECU 30, based on the speed-change signal of the speed-change lever 7 and outputs of the various sensors, commands the power unit 6 to control the first to third actuators 4, 5 and 31.

The ECU 30 is provided with a judge means 17 comprised of a CPU, a clutch control portion 18, a synchro control portion 19 and a throttle control portion 20 respectively controlling the first actuator 4, the second actuator 5 and the third actuator 31, and a built-in timer 21.

The judge means 17, based on a signal 22a from an oil temperature sensor 22 which detects temperature of an oil in the transmission 2, determines whether to perform a normal speed-change or a speed-change according to the present invention. In case of the normal speed-change, the judge means 17 commands the clutch control portion 18 and the synchro control portion 19 control performance thereof; in case of the speed-change according to the present invention it commands the clutch control portion 18, the synchro control portion 19 and the throttle portion 20 control performance thereof.

The clutch control portion 18 outputs a drive signal 18a to connect/disconnect (interrupt) the clutch 3 to the power unit 6. The clutch control portion 18 controls the power unit 6 and the first actuator 4 to interrupt the clutch 3 in a predetermined time period in the normal speed change, and it controls the power unit 6 and the first actuator 4 to connect the clutch 3 temporarily once for increasing the rotate speed of the input shaft 10, and then to interrupt the clutch 3. To the clutch control portion 18, a sleeve position signal 23a of a stroke sensor 23 built in the second actuator 5 is inputted, based on which the clutch control portion 18 can recognize an operate condition (position of the sleeve 13) of the synchro mechanism 9. The clutch control portion 18, based on the sleeve position signal 23a, sets the interrupted condition of the clutch 3 prior to the shift-fall of the synchro mechanism 9, and the connected condition of the clutch 3 after shift completion of the synchro mechanism 9.

The synchro control portion 19 outputs a drive signal 19*a* to set the synchro mechanism 9 of the transmission 2 in a target shift to the power unit 6. In detail, the synchro control portion 19 controls, under the interrupted condition of the clutch 3, the power unit 6 and the second actuator 5 to perform the shift-fall operation and the shift push-in operation (including the synchronize and push-apart operations, same in the rest) in the normal speed-change. On the other hand, the synchro control portion 19 controls, under temporarily connected condition of the clutch 3 connected once to increase the rotate speed of the input shaft 10, the power unit 6 and the second actuator 5 to perform the shift-fall and the shift push-in operations, in the speed-change according to the present invention.

The throttle control portion 20 operates only in the speed-change according to the present invention, and it can recognize the operate condition of the synchro mechanism 9 by a sleeve signal 23*a* of the stroke sensor 23. This is to perform the speed-change of the present invention in the neutral condition where the sleeve 9 is positioned at the neutral position, before the synchromesh mechanism 9 is shifted-in. The throttle control portion 20, in the speed change according to the present invention, sends the drive signal to the engine 1 via the power unit 6 and the third actuator 31, to control the open degree of throttle of the engine 1 for increasing the rotate speed of the input shaft 10.

The timer 21 starts a timing operation by the sleeve position signal 23*a* from the stroke sensor 23 in the second actuator 5, and outputs a set count-up signal 21*a* to the clutch control portion 18 and the synchro control portion 19. The time period of the count-up signal 21*a* is set in performing the speed-change operation by the present invention in advance based on the experiment and corresponds to a time period in which the rotate speed of the input shaft 10 increases up to the required speed. The count-up signal 21*a* inputted from the timer 21 to the clutch control portion 18 corresponds to the command to interrupt the clutch 3, and the count-up signal 21*a* inputted from the timer 21 to the synchro mechanism 19 corresponds to the command to shift in the synchro mechanism 9.

Figure 2:
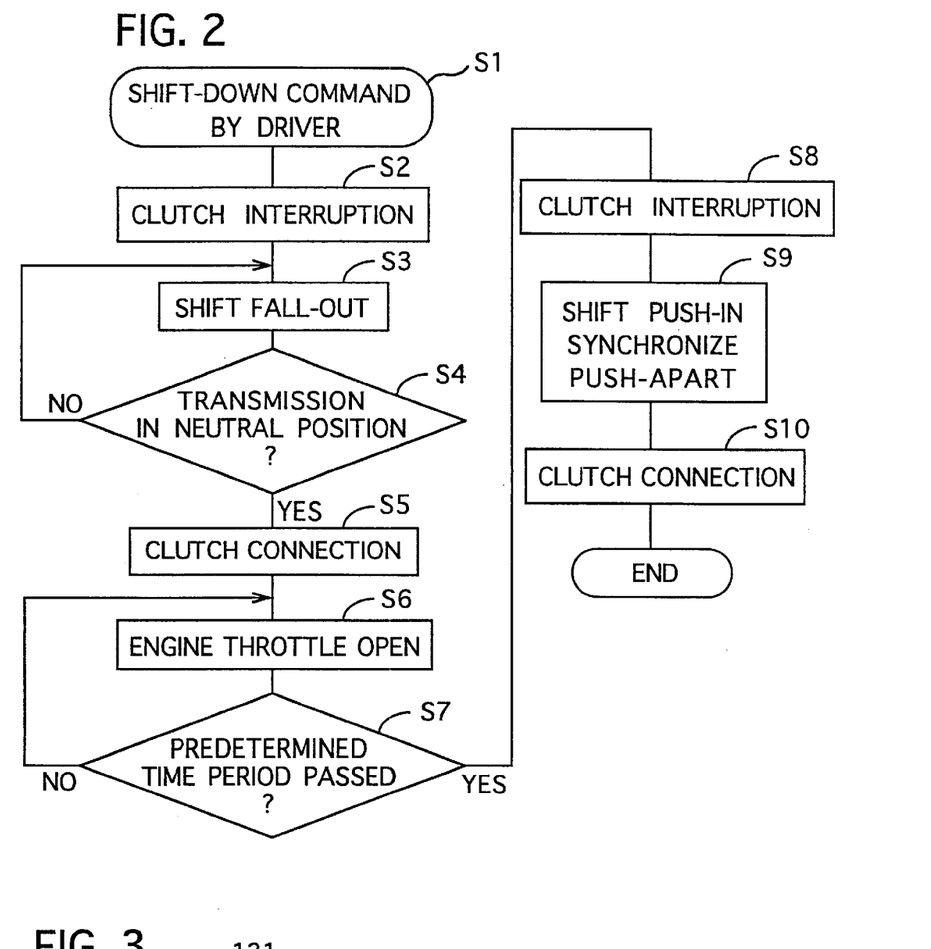
FIG. 2 is a flow-chart showing a shift method of the first embodiment.

Next, the shift control apparatus and the shift control method of the automatic transmission thus constructed will be explained with reference to FIGS. 1 and 2. FIG. 2 is a flow-chart of the shift control method carried out when an oil temperature in an oil tank of the synchro mechanism 9 is lower than a predetermined value.

A sequence shown in FIG. 2 is comprised of an interruption of the clutch 3 in a step S2, a shift-fall of the synchro mechanism 9 in steps 3 and 4, a double-clutch operation of the engine 1 and a connection of the clutch 3 in steps S5 to S7, an interruption of the clutch 3 in a step S8, a shift push-in of the synchro mechanism 9 in a step S9, and a connection of the clutch 3 in a step S10.

When the vehicle is running in the cold area, in a case that a signal 22*a* inputted from an oil temperature sensor 22 to the judge means 17 is lower than the predetermined value, a driver handles (shifts down) the speed-change lever 7. When this shift-down operation is detected in a step S1 ("shift-down command by driver"), the judge means 17 sends a command to a clutch control portion 18, which in turn outputs a drive signal 18*a* to a power unit 6. The power unit 6 operates a first actuator 4 to interrupt the clutch 3 ("clutch interruption" in the step S2). Thus, the transmission 2 is disconnected or separated from the engine 1. By interruption of the clutch 3, the numbers of rotation of the engine 1, running speed of the vehicle and the numbers of rotation of the input shaft 10 changes, which are detected by sensors and the clutch control portion 18 continuously sends a command 18*b* to the synchro control portion 19. The synchro control portion 19, based on the command 18*b*, sends out a drive signal 19*a* for the shift-fall of the synchro mechanism 9 to the power unit 6 ("shift-fall" in the step S3).

In the step S3, based on the above drive signal 19*a* from the synchro control portion 19, the shift actuator 5 operates via the power unit 6 so that the sleeve 13 of the synchro mechanism 9 is pushed toward a gear piece 15 (slower free-rotate gear 14L, refer to FIG. 8) and positioned at the neutral position. A stroke sensor 23 provided in the shift actuator 5 detects a position of the sleeve 13 and outputs a sleeve signal 23*a* to the clutch control portion 18 so that the clutch control portion 18 judges whether the transmission 2 is in the neutral position or not ("transmission in neutral position" in the step S4). As long as the sleeve position signal 23*a* corresponding to the neutral position is not obtained, the clutch control portion 18 and the synchro control portion 19 continue to operate the power unit 6, the first and second actuators 4 and 5, and repeats the shift-fall of the synchro mechanism 9 of the step S3, and shift confirmation of the transmission 2 to the neutral position of the step S4.

When the sleeve signal 23*a* corresponds to the neutral position, the clutch 3 is temporarily connected via the clutch control portion 18, the power 6 and the first actuator 4 ("clutch connection" in the step S5). The temporal connection of the clutch 3 in the shift-fall condition is for increasing the rotate speed of the input shaft 10 (refer to FIG. 9) so that the slower free-rotate gear 14L is brought into an accelerated condition relative to the sleeve 13. This corresponds to so-called "double-clutch operation". In detail, in connected condition of the clutch 3, opened degree of the throttle of the engine 1 is adjusted (for example, fully opened) via the throttle control portion 20, the power unit 6 and the third actuator 31 to increase the rotate speed of the input shaft 10. In the increased rotate speed of the input shaft 10, the slower free-rotate gear 14L rotates faster than the counter shaft 11 and the sleeve 13 mounted thereon ("engine throttle open" in the step S6).

The time period in which the rotate speed of the input shaft 10 exceeds that of the counter shaft 11 is determined by opened degree of the throttle of the engine 1, so time period is measured in advance through experiment and is set in a timer 21. The timer 21, based on the sleeve position signal 23*a* inputted from the stroke sensor 23 as a set signal in the step S4, starts a time count operation. This count time period of the timer 21 corresponds to a double-clutch operate time period. In this embodiment, by temporal connection of the clutch 3 carried out by the clutch control portion 18, the power unit 6 and the first actuator 4 in the step S5, the rotate speed of the slower free-rotate gear 14L is set in the accelerated condition relative to the sleeve 13.

In the step 6, the throttle control portion 20 opens the throttle of engine 1, via the power unit 6 and the third actuator 31, to thereby increase the numbers of rotation of the engine 1 i.e. the slower free-rotate gear 14L. The judge means 17 judges whether the opened time period of the throttle set by the timer 21 has passed or not ("predetermined time period passed?" in the step S7), and if passed, the count signal 2*a* of the timer 21 is inputted to the clutch control portion 18. Based on it, the clutch control portion 18 outputs a drive signal 18*a* to interrupt the clutch 3 via the power unit 6 and the first actuator 4 ("clutch interruption" in the step S8). To the contrary, it is judged that the opened time period of the timer 21 has not passed in the step S7, the sequence returns to the step S6 to open the throttle of the engine 1 again via the power unit 6 and the third actuator 31.

Upon interruption of the clutch 3, based on the count-up signal 21a continuously outputted from the timer 21, the synchro control portion 19 performs, via the power unit 6 and the shift actuator 5, the shift push-in, synchronization and push-apart operations of the synchro mechanism 9 ("shift push-in, synchronize, push-apart" in the step S9). In the shift push-in process, the shift actuator 5 pushes the sleeve 13 by the drive force F (refer to FIG. 10) toward the gear piece 15 of the slower free-rotate gear 14L. Thus, the ring 16 is accelerated by the free-rotate gear 14L and is brought into the push-apart condition shown in FIG. 3.

Upon completion of the shift push-in of the synchro mechanism 9, the clutch control portion 18 is operated by the sleeve position signal 23a from the stroke sensor 23, and connects via the power unit 6 and the first actuator 4 the clutch 3 ("clutch connection" in the step 10), thereby completing the down-shift operation.

Figure 4:
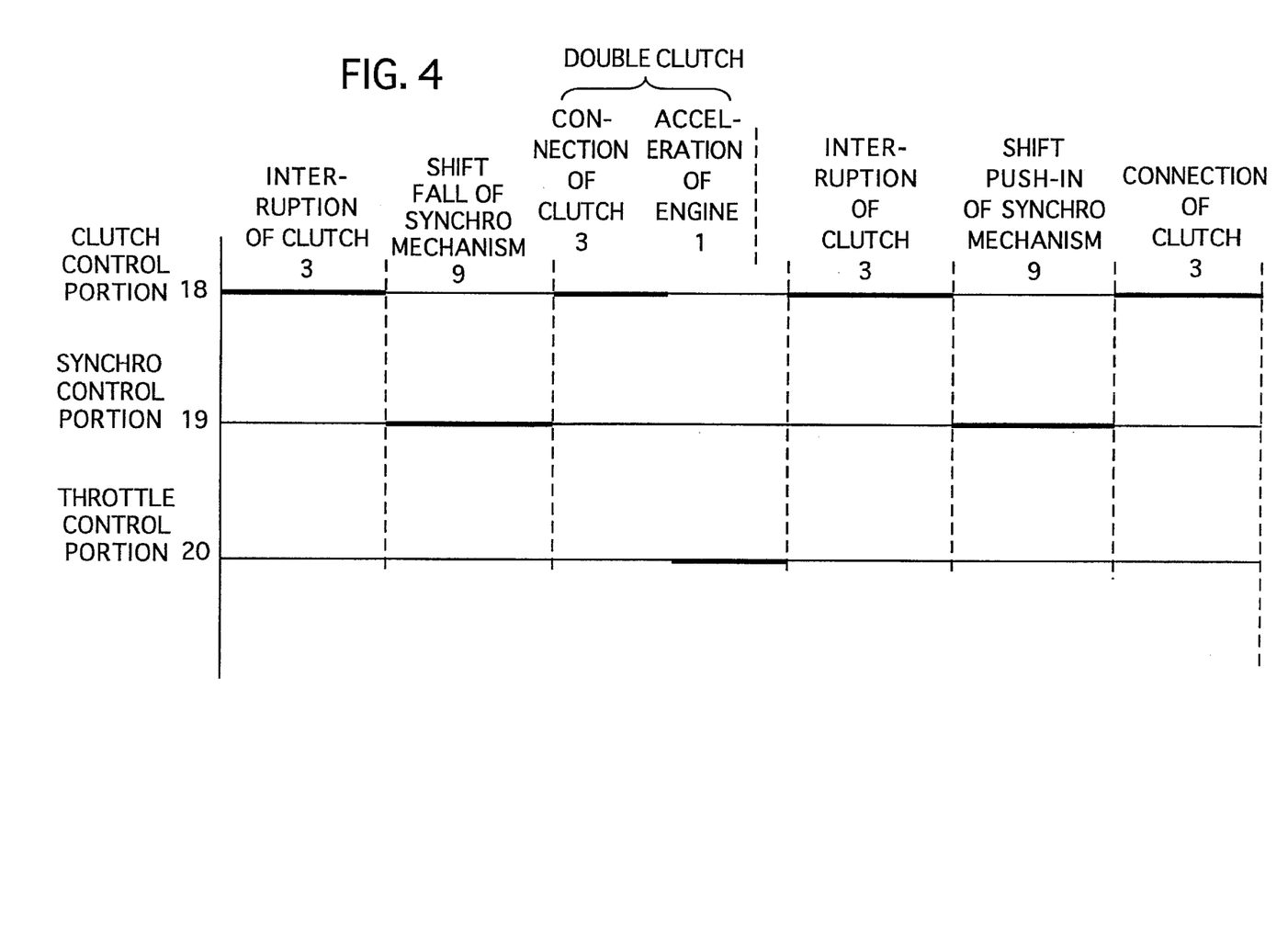
FIG. 4 is an operative view of the first embodiment.

Relation between each of above processes and operations of the clutch control portion 18, the synchro control portion 19 and the throttle control portion 20 is summarized in FIG. 4. Apparent from FIG. 4, the clutch control portion 18 controls the power unit 6 and the first actuator 4 so that the clutch 3 is connected and interrupted alternately. The synchro control portion 19, upon the first interruption of the clutch 3 by the clutch control portion 18, controls the power unit 6 and the second actuator 5 so that the synchro mechanism 9 is shifted-fall (separation from the faster shift); upon the first connection of the clutch 3, controls the power unit 6 and the third actuator 31 so that the throttle of the engine 1 is opened for acceleration. Upon next interruption of the clutch 3 by the clutch control portion 18, the synchro control portion 19 shifts push-in the synchro mechanism 9 (engagement with the slower shift). Then the clutch control portion 18 connects the clutch 3.

Figure 3:
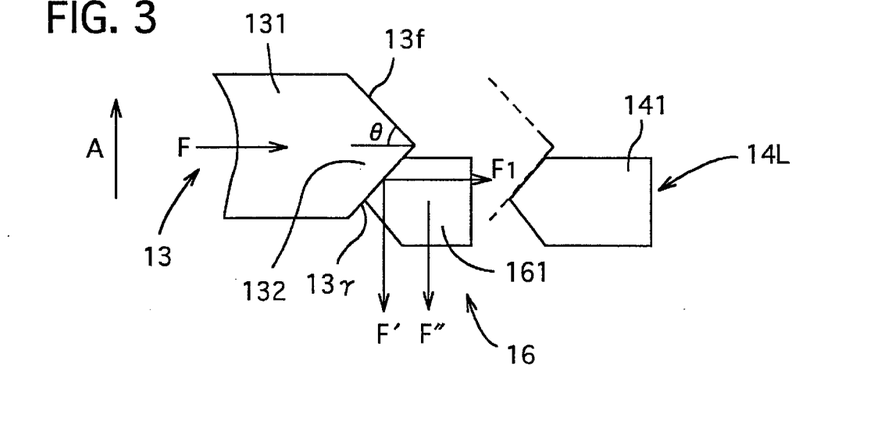
FIG. 3 is an operative view of the first embodiment.

As mentioned above, in the present embodiment, when the transmission 2 is shifted down in running in the cold area, as shown in FIG. 3, the sleeve 13 receives the outer tooth 161 of the ring 16 on the rear surface 13r which faces rearwardly relative to the rotate direction A of the counter shaft 11, and generates the push-apart force F' directed in the same direction as the agitate force F''' applied by the oil. As the result, the ring 16 receives the push-apart force F' from the sleeve 13 and the agitate force F''' from the oil which are directed in the same direction, and meshes with the gear piece 15 of the lower-speed free-rotate gear 14L. In this way, the drive force F for the sleeve 13 by the second actuator 5 can be reduced, so that the second actuator 5 itself and the power unit 6 to drive it can constructed in a low power specification, thereby making the whole apparatus simply and compact.

Meanwhile, in the normal running, the transmission 2 is shifted and the clutch 3 is operated by the power unit 6 and the first and second actuators 4 and 5 controlled by the clutch control portion 18 and the synchro control portion 19. That is, the synchro mechanism 9 is shifted-fall and shifted push-in with interrupting the clutch 3, and then the clutch 3 is connected.

<Second Embodiment>

Figure 6:
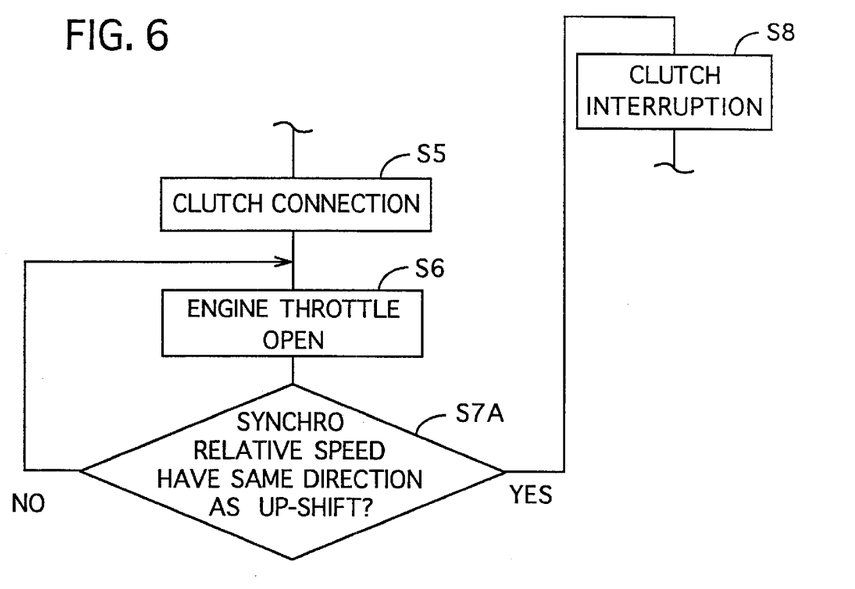
FIG. 6 is a flow-chart showing a shift method of the second embodiment.

In a second embodiment of the present invention, the timing when the rotate speed of the input shaft 10 of the synchro mechanism 9 exceeds that of the counter shaft 11 in the double-clutch operation is detected by detecting the numbers of rotation of these shafts 10 and 11. In detail, as shown in a flow-chart of FIG. 6, the numbers of rotation of the input shaft 10 and that of the counter shaft 11 are compared to judge the former exceeds the latter or not ("synchro relative speed have same direction as up-shift" in the step S7A).

Figure 5:
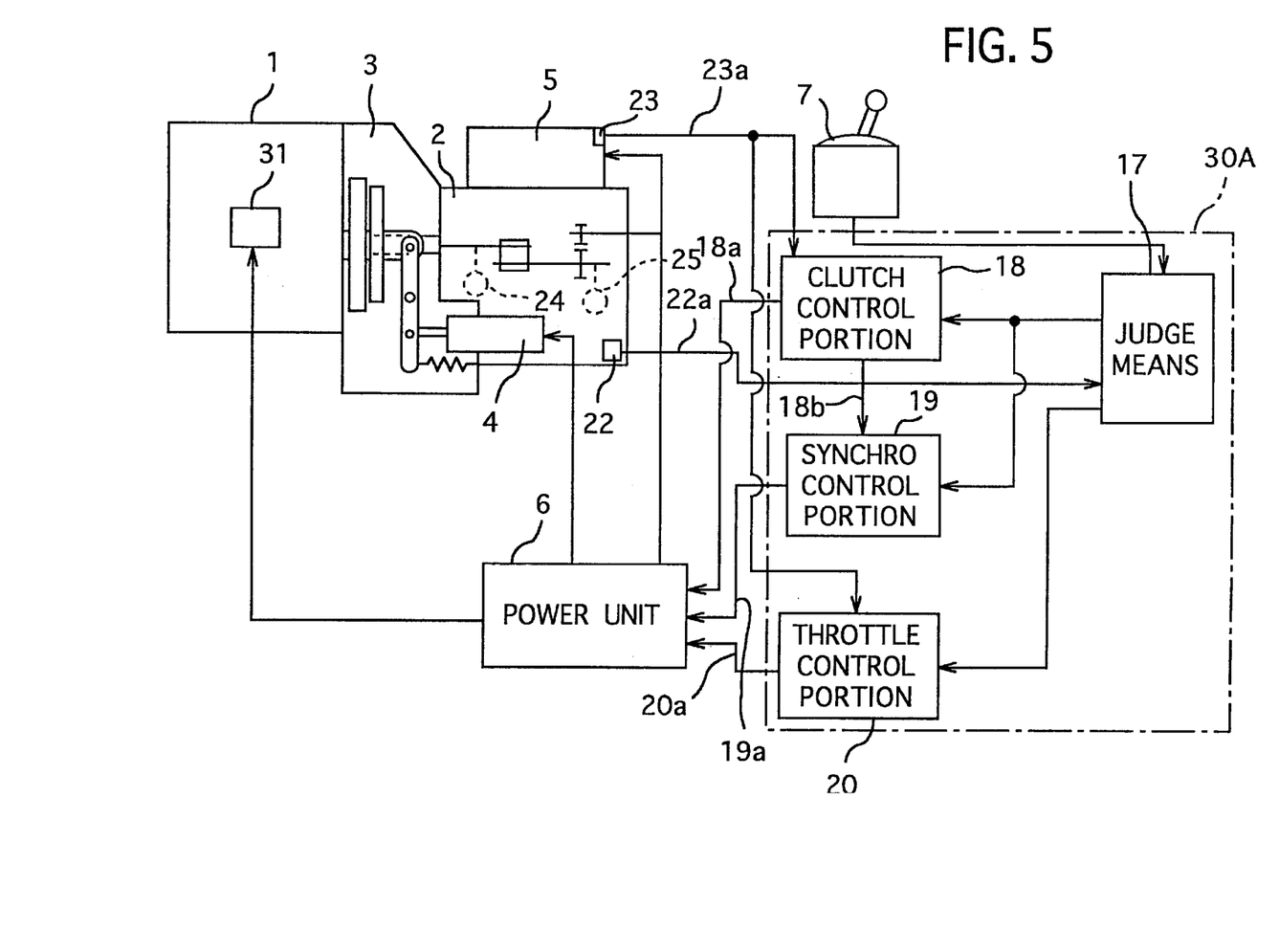
FIG. 5 is a constructive view showing a second embodiment of an automatic transmission according to the present invention.

Corresponding to such shift control process, in the transmission, as shown in FIG. 5, a rotate speed sensor 24 for detecting a rotate speed of the input shaft 10, and a rotate speed sensor 25 for detecting a rotate speed of the counter shaft 11 are provided in the transmission 2 to compare the both outputs in the judge means 17 in a EcU 30A. When the output from the sensor 24 exceeds the output from the sensor 25, that is, when the rotate speed of the input shaft 10 exceeds that of the counter shaft 11 (the rotate speed of the sleeve 13) by the predetermined amount, the judge means 17 outputs a command to the clutch control portion 1 8. Based on it, the clutch control portion 18 controls the power unit 6 and the first actuator 4 to complete the double-clutch operation of the clutch 3.

It is noted that, the clutch 3 can be connected once or can be connected in plural times intermittently, until the rotate speed of the input shaft 10 exceeds that of the counter shaft 11.

<Modification>

As a modification of the above second embodiment, only one of the rotate speed sensors 24 and 25 can be provided on the input shaft 10 or the counter shaft 11. In this case, the rotate speed of the input shaft 10 or the counter shaft 11 when the former exceeds the latter is measured in advance and is stored in a memory in the judge means 17 for comparison.

Figure 7:
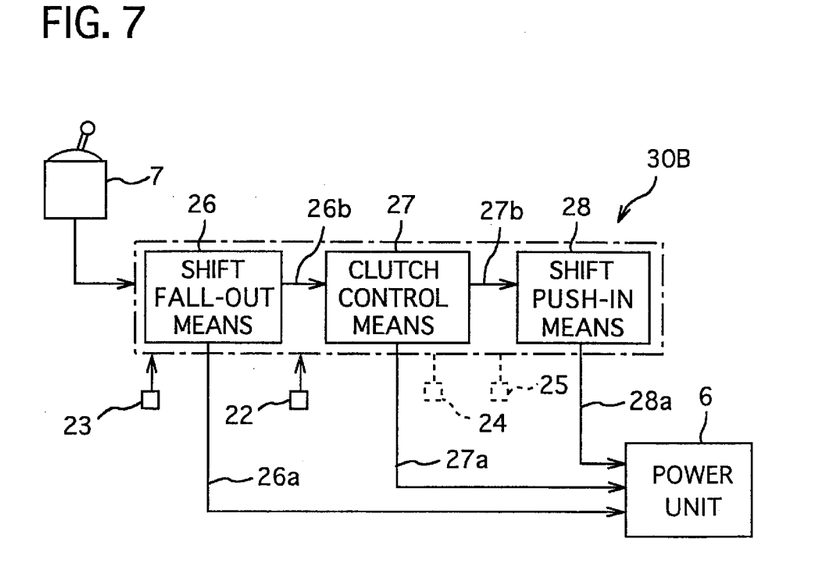
FIG. 7 is a constructive view showing a third embodiment of an automatic transmission according to the present invention.

Next, in FIG. 7, an another ECU 30B to be used instead of the clutch control portion 18 and the synchro control portion 19 of the ECU 30 of FIG. 1 and the ECU 30A of FIG. 5 is shown. This EcU 30B is comprised of a shift-fall means 26 to shift fall the synchro mechanism 9 carried out in the steps S3 and S4 in FIG. 2, a clutch connect means 27 to perform the double-clutch operation of the clutch 3 shown in steps S5 to S7 in FIG. 2 or in the steps S5 to S7A in FIG. 5, and a shift push-in means 28 to shift push in the synchro mechanism in the steps S9 and S10 in FIG. 5.

The shift-fall means 26, in condition where the clutch 3 is interrupted by the first actuator 4 in FIGS. 1 and 5, outputs a signal 26a to retract (shift fall) the sleeve 13 of the synchro mechanism 9 via the shift actuator 5 to the power unit 6. Also, the shift-fall means 26, having detected the neutral condition of the sleeve 13 by signal from the stroke sensor 23, output a next operate command 26b to the clutch connect means 27. The judge means 17, the synchro control portion 19, the power unit 6 and the shift actuator 5 in the first and second embodiments construct the shift-fall means 26.

The clutch connect means 27 outputs a drive signal 27a to perform the double-clutch operation of the clutch 3 via the first actuator 4 to the power unit 6. Also, the clutch connect means 27, when the sensors 24 and 25 detect the fact the throttle of engine 1 is opened and the rotate speed of the input shaft 10 exceeds that of the counter shaft 11 by the predetermined amount, outputs a next operate command to the shift push-in means 28. The judge means 17, the clutch control portion 18, the power unit 6 and the first actuator 4 construct the clutch connect means 27.

The shift push-in means 28, in interrupted condition of the clutch 3 by the first actuator 4, outputs a drive signal 28a to advance (shift push-in) the sleeve 13 in the synchro mechanism 9 via the second actuator 5 to the power unit 6. Above components constructing the shift-fall means 26 also construct the shift push-in means 28.

According to this modification, the down-shift operation of the transmission 2 is carried out sequentially by the sequential process.

What is claimed is:

1. A shift control apparatus for controlling an automatic transmission, comprising:
   a transmission including a synchro mechanism having at least one set of sleeve and a pair of free-rotate gears relatively rotatable on a rotate shaft;
   a clutch disposed between said transmission and an engine;
   a first drive means for operating said clutch;
   a second drive means for operating the synchro mechanism of said transmission;
   a third drive means for varying the number of rotation of the engine; and
   a control unit for controlling said first drive means, said second drive means and said third drive means based on a speed-change signal in a speed-change of said transmission, said control unit including (1) a clutch control portion to control said first drive means so that said transmission is separated from the engine, then temporarily connected to the engine and then separated from the engine, (2) a synchro control portion to drive said second drive means so that the synchro mechanism of said transmission is shifted-fall when said transmission is firstly separated from the engine, and is shifted push-in when said transmission is secondary separated from the engine, and (3) an engine control portion to control said third drive means so that the numbers of rotation of the engine is increased when the synchro mechanism is shifted fall and said transmission is temporarily connected with the engine.

2. A shift control apparatus according to claim 1, wherein the synchro control portion shifts-fall the synchro mechanism, after the first interruption of said clutch is detected by decrease of the numbers of rotation of the engine or an input shaft, or decrease of a vehicle running speed.

3. A shift control apparatus according to claim 2, wherein the synchro control portion, when temperature decrease of an oil in said transmission below a predetermined value is detected, causes the sleeve to separate from a faster free-rotate gear in the shift-fall of the synchro mechanism and the sleeve to engage with a slower free-rotate gear in shift push-in of the synchro mechanism.

4. A shift control apparatus according to claim 1, wherein the clutch control portion temporarily connects said clutch, after the shift-fall of the synchro mechanism is detected by a stroke sensor disposed in said second drive means.

5. A shift control apparatus according to claim 4, wherein the engine control portion, after a temporal connection of said clutch is detected, accelerates the engine so that the numbers of rotation of the slower free-rotate gear exceeds the numbers of rotation of the sleeve of the synchro mechanism.

6. A shift control apparatus according to claim 5, wherein a temporally connected time period of said clutch by the clutch control portion and an accelerated time period of the engine by the engine control portion, are controlled by a timer operating in a predetermined time period after the shift-fall of the synchro mechanism by the synchro control portion.

7. A shift control apparatus according to claim 5, wherein a temporally connected time period of said clutch by the clutch control portion and an accelerated time period of the engine by the engine control portion, terminate when the numbers of rotation of the slower free-rotate gear exceeds the numbers of rotation of the sleeve of the synchro mechanism.

8. A shift control method of for controlling an automatic transmission including a transmission having a synchro mechanism having at least one set of sleeve and a pair of free-rotate gears relatively rotatable in a rotate shaft, a clutch disposed between said transmission and an engine, a first drive means for operating the clutch, a second drive means for operating the synchro mechanism of the transmission, and a third drive means for varying the numbers of rotation of the engine, by a control unit having a clutch control portion, a synchro control portion and a engine control portion respectively controlling the first drive means, the second drive means and the third drive means based on a speed-change signal in a speed-change of the transmission, comprising steps of:
   a shift-fall step for shifting fall the synchro mechanism by the synchro control portion via the second drive means, in condition where the transmission is separated from the engine by the clutch control portion via the first drive means;
   a clutch connect step for connecting the clutch temporally by the clutch control portion via the first drive means and for accelerating the engine by the engine control portion via the third drive means, in neutral condition of the clutch performed in said shift-fall step; and
   a shift push-in step for shifting push-in the synchro mechanism by the synchro control portion via the second drive means, in condition where the transmission is separated from the engine by the clutch control portion via the first drive means.

* * * * *